May 26, 1936.  B. HERWANDER  2,041,926
HAY LOADER
Filed April 20, 1933  2 Sheets-Sheet 1
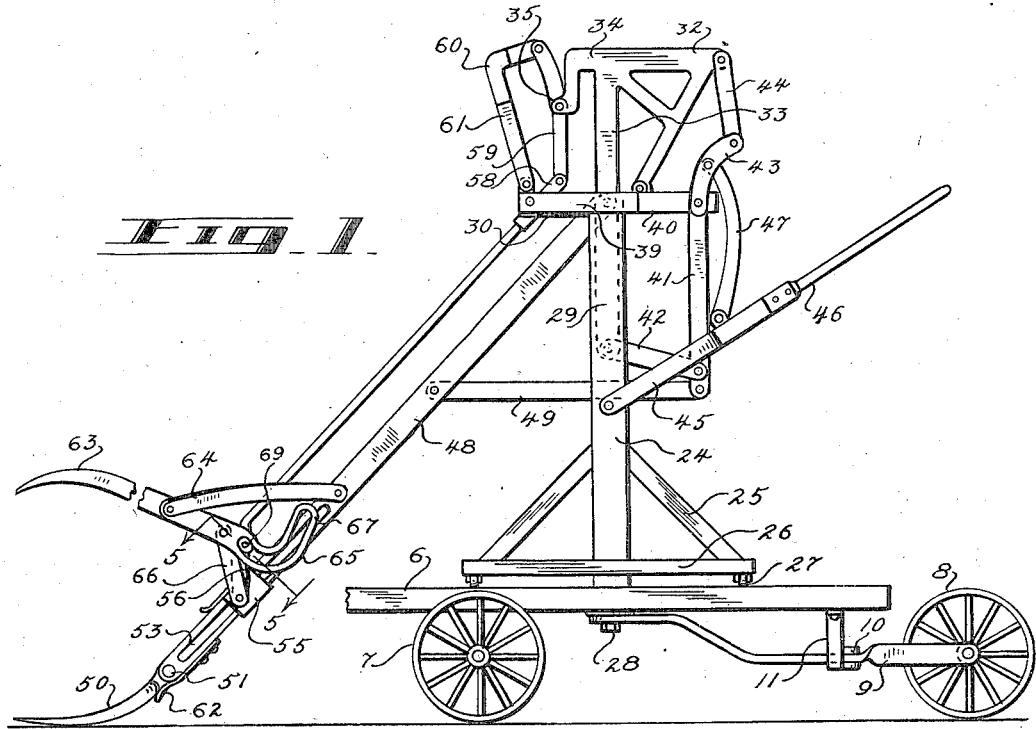
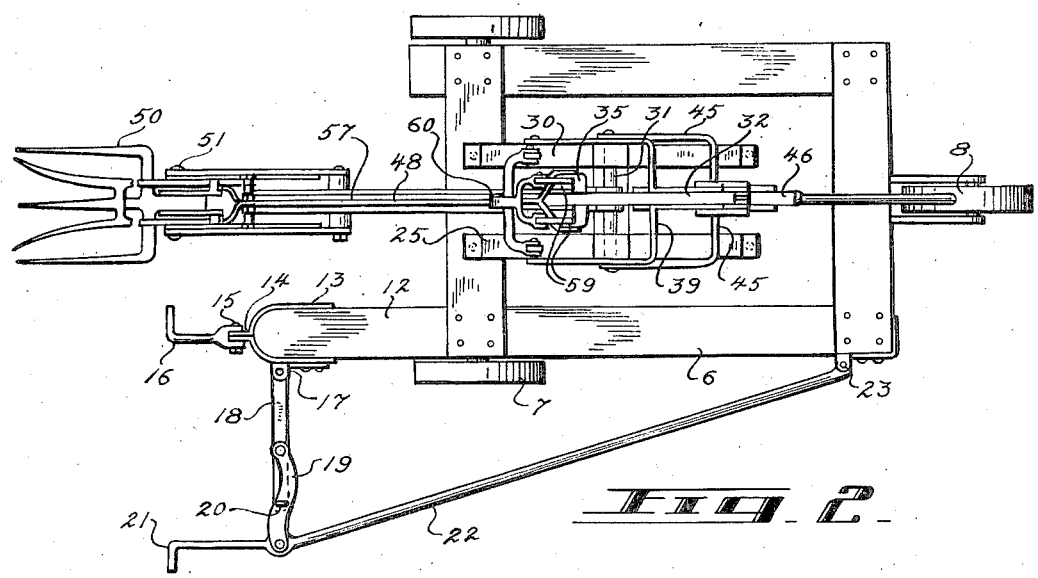
INVENTOR
Berg Herwander
BY
ATTORNEY May 26, 1936. B. HERWANDER 2,041,926
HAY LOADER
Filed April 20, 1933 2 Sheets-Sheet 2

INVENTOR
Berg Herwander
BY
ATTORNEY

Patented May 26, 1936

2,041,926

UNITED STATES PATENT OFFICE 2,041,926

HAY LOADER

Berg Herwander, Wamsley, Ontario, Canada

Application April 20, 1933, Serial No. 667,066
In Canada June 20, 1932

7 Claims. (Cl. 214—140)

This present invention relates to improvements in a hay loader and appertains particularly to a device for lifting bales of hay or other bundles to a wagon, a warehouse platform, a loading freight car or to other place of storage or medium of transport.

An object of the invention is to provide a movable loader of this kind adapted to be driven or trailed from place to place.

A further object of the invention is to provide a loading machine of this character whose material handling superstructure is mounted on a wheeled truck and rotatable with respect thereto on its vertical axis so that the load may be raised and swung horizontally through any desired angle.

A further object of the invention is to provide a loading machine that grabs and releases its load automatically.

A further object of the invention is to provide an automatic loading machine operated by a single lever that works the closing, raising, swinging and releasing of the material handling jaws.

A further object of the invention is to provide an automatic material handling machine for loading bales of hay and the like wherein the gripping jaws close to engage and open to release the load in conjunction with and controlled by the vertical movement thereof.

A still further object of this invention is the provision of a hay loader of the nature and for the purposes described that is characterized by structural simplicity and durability and ready adaptability to a wide variety of material handling problems, requires the minimum of attention from a lone operator, is easily moved to and from location and being capable of manufacture at a reasonable cost is thereby rendered commercially desirable.

To the accomplishment of these and related objects as shall become apparent as the description proceeds, my invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

In the drawings:—

Figure 1 is a side elevation of my improved loader with the jaws in position to engage a load;

Figure 2 is a plan view thereof;

Figure 3:
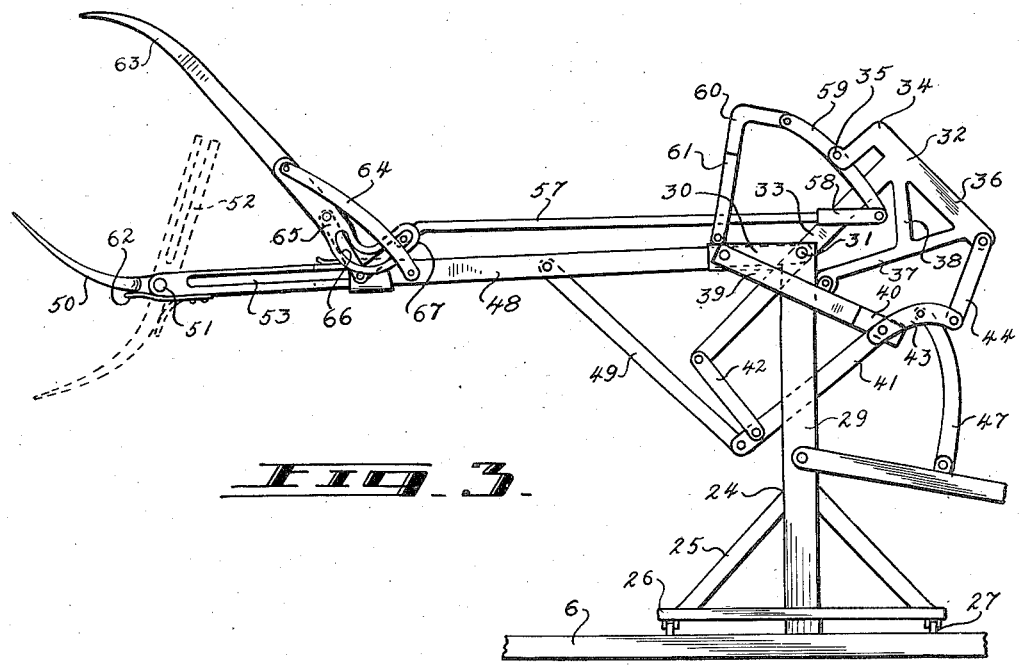
Figure 3 is a side elevation showing the material handling jaws in raised position.
Figure 4:
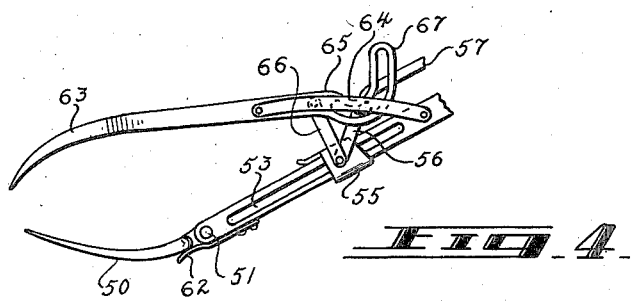
Figure 4 is an elevational detail of the jaws, closed on the load as when lifting.
Figure 5:
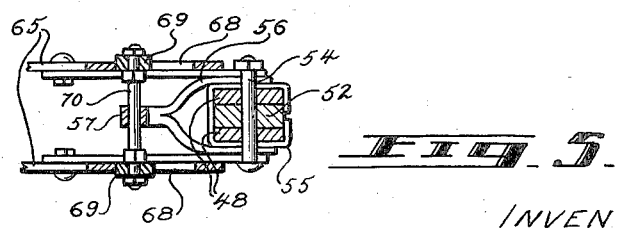
Figure 5 is an enlarged section of the automatic jaw-controlling mechanism as taken on the line 5—5 of Figure 1, looking in the direction indicated by the arrows.

The device is mounted on a portable truck or platform 6 supported at the front on a pair of wheels 7 and at the back by a trailing castor wheel 8 carried on the end of a horizontal rearwardly extending fork 9 pivoted at its forward end and whose lateral swing is limited to the width of a slot 10 in a downwardly offset or underslung hanger 11 that extends transversely of the rear of the truck and is attached to the underside thereof. The left side frame member of the platform 6 is extended forwardly to provide a tongue 12 that is shod at the front with a pair of companion plates 13 that are flanged forwardly or outwardly as at 14 at their juncture, through which flanges a horizontal pivot 15 projects to carry the bifurcated end of an inturned L that straddles the said flanges. On the outside of this tongue 12 near its forward end a pivot plate 17 attaches in which an arm 18 is hinged to swing horizontally. Halfway to its outer end a second arm 19 hinges to this first arm 18 and is adapted to be locked therewith by a vertical key pin 20 that drops through registering openings in the outer end of the first arm 18 and about the middle of the second arm 19 when the two arms are aligned. The outer end of this second arm 19 in this position is extended well out from the side of the truck and pivoted to this outer end is an outturned L 21 whose outturned end lies in the same plane as the inturned end of the L 16 but whose stem 22 does not terminate with the arm 19 but is elongated to continue to the back of the truck 6 to the side of which, at the back, it is connected by the pivot bracket 23. Then if the pin 20 is removed and the alignment of the arms 18 and 19 broken, they may be hinged on their pivotal connection to collapse as a toggle joint, anchored by the pivot 23, so that the L 21 may be swung in against the side of the truck. These oppositely turned L's 16 and 21 that may be spread laterally provide for attachment to any suitable draft medium as for instance to engage in the rear bolster of a truck or wagon.

A vertical tower 24 is mounted on the truck or platform 6 being adapted to rotate or swivel on its vertical axis and for this reason has its upright rigidity supported by the leaning braces 25 from a base work 26 that rides on the platform 6 with castors 27. This tower 24 connects with the platform 6 by a king pin 28 coming up from the underside of the platform that further serves as the pivot for the forward end of the fork 9 supporting the rear trailing wheel or castor 8. At the top of the tower 24 which comprises a pair of laterally spaced posts 29, are forward extensions 30.

Between these posts 29, at the top, is a horizontal shaft 31 on which a T frame 32 pivots by the middle of its stem 33. From the short forward side 34 of its crosshead a depending and forwardly offset lateral bifurcation 35 occurs. The rear side 36 of the T's cross-head has a strip 27 that drops from its end and hangs in toward the stem 33, being strengthened by a brace 38 from the juncture of the stem 33 and the rear side of the cross-head.

A yoke 39 pivots by the ends of its arms to the outside of the forward extensions 30 near the front thereof, and extends around the back of the tower 24 where it attaches to the lower end of the braced angle strip 37 of the T frame 32 by a loose pivotal connection to the rear of which a tail 40 extends in which a depending link 41 pivots at its upper end and lying substantially parallel with the stem of the T frame 32 connects with the base thereof by a short link 42. From the tail 40 of the yoke 39 a short arcuate coupling 43 rounds upwardly and rearwardly having its outer end connecting with the back of the rear side 36 of the T crosshead by a link 44.

To opposite sides of the tower 24 the ends of the arms 45 of the bifurcated handle 46 connect pivotally and from the handle 46 to the rear of the tower 24 to the arcuate coupling 43, a draw rod 47 extends. Thus on the vertical hinging of this handle 46 is the T and its associated mechanisms rocked.

A long arm 48, formed of a pair of spaced side frames, extends forward from the horizontal shaft 31 on which it is adapted to hinge vertically and connects by push bar 49 with the lower end of the link 41 that swings with the tail 33 of the T thus raising and lowering the arm 48 by the handle 46. A fork 50 pivots on the horizontal pin 51 in the outer end of the arm 48, its stem 52 extending up between the side frame members of the arm and slotted horizontally from near its pivot pin 51 to the end of its stem 52. Slots 53 occur in the side frames of the arm 48 registering with the slot in the fork's stem and with each other. Through these registering slots 53 and that in the stem of the fork 50 a transverse pin 54 rides, sliding a sleeve 55 wrapped around the arm 48, the said pin 54 being carried by the straddling arms 56 of a forked push rod 57 whose upper forked end 58 engages a pair of spaced rocker arms 59 centrally pivoted in the arms of the lateral bifurcation 35 of the depending forward side 34 of the T cross-head. These rocker arms 59 connect at their tops with the end of a rearwardly turned and inverted L 60 whose downwardly extending stem 61 is bifurcated so that the arms thereof hinge on the top of the forward extensions 40 at the front thereof.

On the downward movement of the handle 46 rocking the T 32 and raising the arm 48 by the push bar 49, the forked rod 57 is drawn rearwardly sliding the transverse pin 54 and the sleeve 55 to the upper or rearmost end of the slots 53 in which position the pin 54 has moved out of the open end of the slot in the stem 52 of the fork 50 and the sleeve 55 has cleared the upper side of the said stem's inner end allowing the fork 50 to pivot to drop its load, freed of which it is returned to place by virtue of an underlying leaf spring 62 fastened to the underside of the arm 48 at its outer end. This fork 50 is the bottom one of a pair of co-operating jaws and since it remains rigid with the elevating arm 48, while taking and lifting the load, shall be referred to as the fixed jaw, in addition to which there is a superposing and confronting hinged fork or jaw 63 pivoting in the ends of a pair of spaced upstanding arms 64 from the sides of the frame of the arm 48. The tail of this hinging fork 63 is split laterally and the two spaced fingers 65 thereof, behind the pivotal connections with the arms 64, connect by links 66 with the pin 54 and sleeve 55, and thereafter bend downwards and then round upwards as at 67 in which wave portions are slots 68 of corresponding contour accommodating collar runners 69 on opposite ends of a transverse shaft 70 through the push rod 57 where it bends to its forked end 56, the longitudinal movement of which substantially parallel with the arm 48, closes and later opens this upper hinged jaw 63 as the arm is raised, as the collar runners 69 push upwards and then downwards on the slotted fingers 65 of the fork's split tail. This opening and closing of the upper fork 63 is increased and accelerated by the swinging of the links 66 that cross centre when the collar runners 69 occupy the lowest point in the waves slots 68, closing the jaw to the limit of its movement and similarly increasing the rate and extent of the opening.

From the foregoing description taken in connection with the accompanying drawings, it will be manifest that a hay loader is provided that will fulfill all the necessary requirements of such a device but as many changes could be made in the above description and many apparently widely different embodiments of my invention may be constructed within the scope of the appended claims without departing from the spirit or scope thereof, it is intended that all matters contained in the said accompanying specification and drawings shall be interpreted as illustrative and not in a limitative or restrictive sense.

Having thus described the invention, what is claimed as new is:—

1. A loader comprising a portable platform, a swivelling tower on said platform, a braced base work therefor, rollers supporting said base work of said tower, a vertically swinging arm hinged in the top of said tower, load engaging jaws extending from the free end thereof, a manually operated lever for hinging said arm, a member hinged also in the top of said tower in axial alignment with said arm, and means connecting said lever and said member and said member and said jaws whereby said jaws are controlled on the operation of said lever.

2. A loader comprising a portable platform, a tower swivelling on said platform, a base work therefor, braces supporting said base work, rollers supporting the base work of said tower, an arm hinged by one end to swing vertically in the top of said tower, means for hinging said arm, load engaging jaws on the free end of said arm, and means associated with said arm hinging means and connected with said jaws whereby the latter are adapted to open and close automatically on the vertical movement of said arm.

3. A loader comprising a portable platform, a tower in the form of a vertical post on said platform, rollers supporting the base of said tower, an arm hinged to swing vertically in the top of said tower, a normally fixed lower jaw on the outer end of said arm adapted to trip when said arm reaches a predetermined height, a lever pivoted on said tower for swivelling the same and means connecting said lever and said arm for hinging said arm and means associated with said first mentioned means for causing said jaw to trip.

4. A loader comprising a portable platform, a tower on said platform adapted to swivel on its vertical axis, rollers supporting the base of said tower, an arm hinged to swing vertically in the top of said tower, a normally fixed lower jaw on the outer end of said arm adapted to trip automatically, a hinged jaw that operates on the vertical swinging of said arm and so connected with said normally fixed jaw as to control its automatic tripping and a lever pivoted on said tower and connected with said arm for hinging the same.

5. A portable loader including a wheeled platform, a tower rising therefrom and adapted to swivel on its vertical axis, a transverse horizontal shaft across the top of said tower, an arm pivoted by one end on said shaft, a T-frame connected by the middle of its stem to said shaft, jaws on the free outer end of said arm, connections between said T-frame and said arm and between said T-frame and said jaws and means to rock said T-frame.

6. A portable loader including a wheeled platform, a tower rising therefrom and adapted to swivel on its vertical axis, a transverse horizontal shaft across the top of said tower, an arm hinged by one end on said shaft, a T-frame connected by the middle of its stem to said shaft, jaws on the free outer end of said arm, one of said jaws being normally fixed and the other of said jaws being hinged, connections between said T-frame and said arm and between said T-frame and said hinging jaw and means for rocking said T-frame to raise and lower said arm and operate said hinging jaw, said normally fixed jaw being adapted to trip free when said arm is raised to a predetermined height.

7. A portable loader including a wheeled platform, a tower rising therefrom and adapted to swivel on its vertical axis, a transverse horizontal shaft across the top of said tower, an arm pivoted by one end on said shaft, a T-frame connected by the middle of its stem to said shaft, jaws on the free outer end of said arm, one of said jaws being normally fixed and adapted to trip automatically and the other of said jaws being hinged, a yoke pivoting on said tower forward of said shaft and extending around behind said tower, connections between said yoke and the rear part of the cross-head of said T-frame and the stem thereof, a lever associated with said connections, a push bar between said connections and said arm and a push rod connecting the forward side of the cross-head of said T-frame with said hinged jaw.

BERG HERWANDER.